US 6,638,556 B1

(12) United States Patent
Desai

(10) Patent No.: US 6,638,556 B1
(45) Date of Patent: Oct. 28, 2003

(54) PROCESS OF MAKING A FROZEN WHIPPED TOPPING

(75) Inventor: Manmohan H. Desai, Kailua-Kona, HI (US)

(73) Assignee: Peak Foods, LLC, Boise, ID (US)

( * ) Notice: Subject to any disclaimer, the term of this patent is extended or adjusted under 35 U.S.C. 154(b) by 202 days.

(21) Appl. No.: 09/922,849

(22) Filed: Aug. 7, 2001

(51) Int. Cl.[7] ............................. A23G 9/00; A23C 13/12
(52) U.S. Cl. ...................... 426/570; 426/115; 426/130; 426/613; 426/393; 426/409; 426/519; 426/524
(58) Field of Search .................. 426/570, 565, 426/115, 130, 613, 393, 409, 519, 524; 99/455; 62/135; 261/140.1

(56) References Cited

U.S. PATENT DOCUMENTS

| | | | |
|---|---|---|---|
| 3,251,577 A | | 5/1966 | Bolanowski et al. |
| 3,810,415 A | * | 5/1974 | MacManus ............... 261/178.2 |
| 3,892,388 A | * | 7/1975 | Wass et al. ............... 366/325.7 |
| 4,157,017 A | * | 6/1979 | Reid ........................... 62/135 |
| 4,451,492 A | | 5/1984 | Dell et al. .................. 426/564 |
| 4,478,867 A | | 10/1984 | Zobel et al. ................. 426/570 |
| 5,077,076 A | | 12/1991 | Gonsalves et al. .......... 426/565 |
| 5,273,188 A | * | 12/1993 | Sanino ......................... 222/61 |
| 5,433,967 A | * | 7/1995 | Kateman et al. ............ 426/565 |
| 5,470,153 A | | 11/1995 | De Naeghel ................ 366/303 |
| 5,603,257 A | * | 2/1997 | Kateman et al. .............. 99/455 |
| 5,758,571 A | * | 6/1998 | Kateman et al. .............. 99/455 |

* cited by examiner

Primary Examiner—Nina Bhat
(74) Attorney, Agent, or Firm—Fitzpatrick, Cella, Harper & Scinto

(57) ABSTRACT

A process of making a containerized frozen whipped topping by the following steps is improved:

Figure 1:
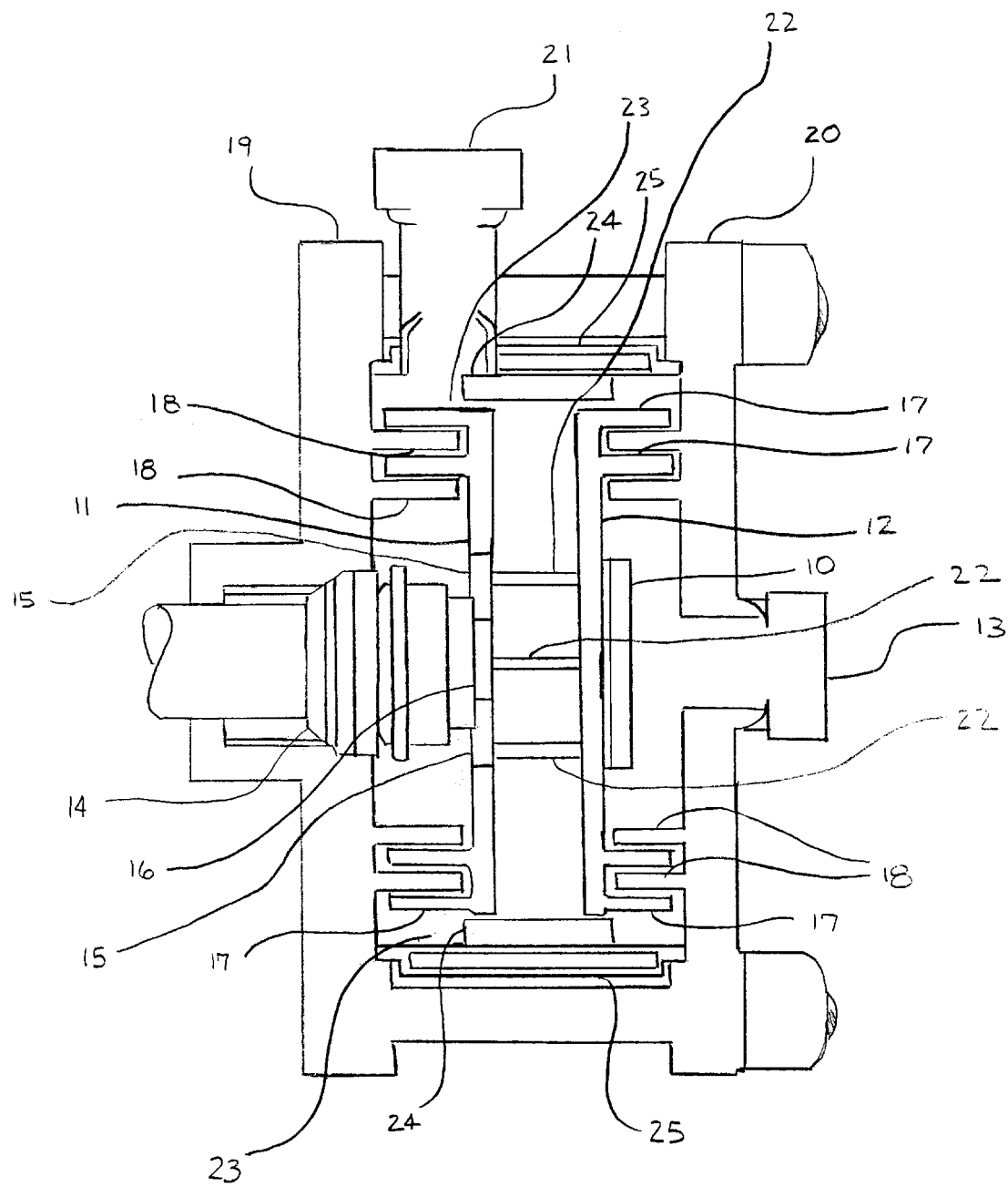

(a) forming a mixture comprising water, water-soluble carbohydrate, fat, protein, emulsifying agent, and thickener;
(b) pasteurizing the mixture;
(c) homogenizing the mixture to form an oil-in-water emulsion;
(d) cooling the emulsion to a temperature in the range of about 27 to 45° F.;
(e) holding the emulsion at a temperature in the range of about 27 to 45° F. for a long enough time to allow at least some of the fat to crystallize;
(f) aerating and whipping the emulsion, under superatmospheric pressure, into a topping;
(g) dispensing the topping into containers; and
(h) freezing the topping while in the containers.

The improvement, which allows lower pressures to be used in step f, involves using two turbulent mixing zones, in which a higher average shear rate is used in the second zone than in the first zone.

16 Claims, 1 Drawing Sheet

PROCESS OF MAKING A FROZEN WHIPPED TOPPING

BACKGROUND OF THE INVENTION

Containerized frozen whipped toppings are commonly made today by a process that includes the following sequential steps:

(a) forming a mixture comprising water, water-soluble carbohydrate, fat, protein, emulsifying agent, and thickener;
(b) pasteurizing the mixture;
(c) homogenizing the mixture to form an oil-in-water emulsion;
(d) cooling the emulsion at a temperature in the range of about 27 to 45° F.;
(e) holding the emulsion at a temperature in the range of about 27 to 45° F. for a long enough time to allow at least some of the fat to crystallize;
(f) aerating and whipping the emulsion, under superatmospheric pressure, into a topping;
(g) dispensing the topping into containers; and
(h) freezing the topping while in the containers.

Steps (f) and (g) typically are performed in a continuous manner, with an unbroken flow path from the aeration of the liquid emulsion to the dispensing of the finished whipped topping.

In the early days of making frozen whipped toppings by such a process, both the aerating and the whipping was done in one intermeshing pin mixer with internal recirculation, e.g., a Votator continuous recirculating mixer. (See, e.g., the process described in U.S. Pat. No. 4,451,492.) The construction and operation of such mixers are described, for example, in U.S. Pat. No. 3,251,577, which is hereby incorporated by reference. The single-step aeration/whipping operation had a drawback, however, in that it was difficult to achieve consistent results, which is important for consumer satisfaction. For example, it is usually desired to achieve about the same level of overrun (say, for example, an overrun of about 275 percent) from one hour to the next and from one day to the next. Overrun is the amount by which the volume of the emulsion is increased, due to the aerating and whipping. The greater the overrun, the lighter is the topping. Such consistency proved difficult to achieve with the single-step aeration/whipping operation. As a result, the weight of the contents of a standard size container could vary significantly, even though they were produced only minutes apart.

In answer to that problem, the process was modified by performing the aerating/whipping operation in two steps, under substantially different pressures. First the emulsion was aerated in an intermeshing pin recirculating mixer under a back pressure of at least 40 psig. Then the pressure was gradually reduced by about 10 to 50 psig, following which the emulsion was whipped in a scraped-surface heat exchanger under a back pressure of about 20 to 70 psig. (See, for example, the processes described in U.S. Pat. Nos. 4,478,867 and 5,077,076.) A scraped-surface heat exchanger is a device with a chamber through which product is pumped, using a rotor with radial arms ending in devices that scrape the inner wall of the chamber, as the rotor turns. Exterior to the chamber is a cooling jacket, which, when activated, can so chill the contents of the chamber that, when an aqueous liquid is being pumped through the chamber, ice crystals will form on the inner chamber wall. The scraping action and turbulence in the chamber distributes those crystals throughout the product.

While good overrun consistency can be achieved by the two-step aeration/whipping procedure just described, it would be desirable if there were an alternative that did not employ such high pressures. The greater the pressure used, the greater the concern for worker safety. Also, higher pressures mean greater wear on operating equipment such as pumps, as well as greater energy consumption.

BRIEF SUMMARY OF THE INVENTION

We have discovered that good overrun consistency can be achieved with a process as described, without having to use back pressures as high as 40 psig or more, if the aerating/whipping operation is performed using two turbulent mixing zones, in which a higher average shear rate is used in the second zone than in the first. Essentially, this new aerating/whipping operation involves the following steps:

(i) adding aeration gas to the cooled emulsion,
(ii) subjecting the gas-containing emulsion to turbulent mixing in a first mixing zone, for a time sufficient to disperse the gas in the emulsion and raise the viscosity of the emulsion, and
(iii) subjecting the resultant emulsion to further turbulent mixing in a second mixing zone, using a higher shear rate than used in the first zone, for a time sufficient to achieve an overrun value of at least about 175 percent.

By performing the aeration/whipping operation in this manner, it is possible, we have found, to achieve good product consistency without having to use back pressures as high as 40 psig at any stage in the process. By the use of such low pressures there is less chance of worker injury in the case of a break in one of the lines that is under pressure. Also, there is less energy consumption, and the rate of wear on certain pieces of the equipment, such as pumps, is reduced.

DETAILED DESCRIPTION OF THE INVENTION

Preferably steps (f) and (g) of the process (from aeration to dispensing) are performed with a substantially continuous flow path of product. Substeps (ii) and (iii) both can be performed in intermeshing vane mixers. These are mixers having mixing chambers in which a rotating set of vanes pass by a second set of interleaving vanes (which may be static or rotating) to create a shear stress on any liquid that is passing through the chamber. Such vanes are often referred to as baffles. They can be various shapes. Preferably pin-shaped vanes will be used in the process of the present invention. The relative movement of the baffles past each other develops localized turbulence that results in relatively high shear stresses. The closer the clearance between cooperating vanes, the greater the stress.

What is wanted in the present process is greater agitation intensity in the second mixing zone than in the first mixing zone. To achieve this a greater average shear rate is used in the second mixing zone. Shear rate is the quotient of velocity divided by the distance between the shear surfaces. It is conventionally measured in reciprocal seconds (sec.$^{-1}$). A discussion of shear (turbulence), shear stress, and shear rate may be found, for example in the book "Fluid Mixing and Gas Dispersion in Agitated Tanks" by G. B. Tatterson (McGraw-Hill, Inc. 1991), as well as in Volume III, Chapter 15 of the book "Mixing Theory and Practice," by V. W. Uhl and J. B. Gray (Academic Press 1986), both of which are hereby incorporated herein by reference. A higher average shear rate can be achieved by using a higher rotational speed and/or a shorter distance between the cooperating shear surfaces. In the present invention, the average shear rate used in the second mixing zone preferably is at least approximately 50% higher than that used in the first mixing zone. Thus, for example, the average shear rate used in the first mixing zone might be approximately 20 sec$^{-1}$ or less, e.g., in the range of about 10 to 20 sec$^{-1}$, and the average shear rate in the second mixing zone might be approximately 30 sec$^{-1}$ or more.

The aeration gas may be added to the emulsion in the first mixing zone. Preferably there is substantially no additional aeration gas added to the emulsion in the second mixing zone.

The mixing in the first zone preferably is conducted for a long enough time to raise the viscosity of the emulsion by at least about 100 centipoises (cp). (This is as measured after the emulsion, which is at superatmospheric pressure, is allowed to gradually be brought to atmospheric pressure.) Thus, for example, the emulsion might leave the first mixing zone at a viscosity of about 200 to 300 cp.

Preferably a recirculating mixer is used for the first mixing zone. An example of such is disclosed in the aforementioned U.S. Pat. No. 3,251,577.

In the second mixing zone the mixing preferably is conducted for a time sufficient to achieve an overrun value in the range of about 200 to 350 percent. This, of course, is as measured on a sample that has been allowed it to gradually equilibrate to atmospheric pressure. The mixer used for the second mixing zone preferably is a non-recirculating one. Preferably, substantially no additional aeration gas is added to the emulsion in the second mixing zone.

During all of step (f) (aerating and whipping) the emulsion preferably is not allowed to warm to a temperature higher than about 60° F. Most preferably, the topping will emerge from step (f) at a temperature in the range of about 52 to 57° F. During substeps (i) and (ii) (gas addition and first-zone mixing) it is preferred that the emulsion not be allowed to warm to a temperature higher than about 50° F. Most preferably it will emerge from substep (ii) at a temperature in the range of about 45 to 50° F. Since the turbulent mixing can cause the emulsion to become excessively warm, preferably both mixers will be equipped with cooling jackets.

Preferably step (f) (aerating and whipping) also comprises, as a further substep, the step of subjecting the emulsion from the second turbulent mixing zone (substep (iii)) to further mixing in a scraped-surface heat exchanger. One benefit of this additional mixing step is that it tends to give the topping a more uniform appearance—i.e., there will be less variation in the size of the gas bubbles in the topping. The viscosity of the topping will usually be increased as well. The result is a generally improved mouth feel when the topping is eaten.

If used, the scraped-surface heat exchanger is preferably cooled, so as to at least partially compensate for the frictional heat that is generated by the action of the scraper. Preferably the cooling will be sufficient to prevent the topping from reaching a temperature higher than about 60° F. as it passes through the heat exchanger.

To achieve the full potential benefit of the present invention, preferably the back pressure that the product is under from substep (i) (addition of aeration gas) through step (g) (dispensing into containers) is always less than 40 psig, e.g., within the range of about 15 to 35 psig. If there is a substantially continuous flow path of product from substep (i) through step (g), then the back pressure will be greatest during substep (i) and least in the last mixing chamber. If the topping is finished in a scraped-surface heat exchanger, then the back pressure in that chamber might be, for example, in the range of about 20 to 30 psig.

Preferably the conditions are maintained so that the finished whipped topping that is dispensed into the containers has an overrun in the range of about 200 to 350 percent.

The aforementioned steps (a), (b), (c), (d), (e), (g), and (h) are well known in the art, and each requires little or no further discussion here, apart from the specific example that will be given.

As mentioned, the mixture formed in step (a) should comprise water, water-soluble carbohydrate, fat, protein, emulsifying agent, and thickener. Other ingredients, such as, for example, flavoring agents, colorants, food starches, nutritional additives (e.g., vitamins and/or minerals), alkalizing agents (e.g., sodium hydroxide), buffering agents (e.g., phosphate salts), and/or flavor intensifiers (e.g., salt), can also be included.

As suitable water-soluble carbohydrates may be mentioned, for example, corn syrup (either the regular version or the high fructose version), sucrose, dextrose, maltose, invert sugar, galactose, lactose hydrolyzates, and lactose (e.g., as supplied by cream).

The fat component can be supplied by any of the animal or vegetable fats or oils that commonly are used in prepared foods. Thus, for example, milk fat or hydrogenated vegetable oil (e.g., hydrogenated coconut oil and/or hydrogenated palm kernel oil) can be used.

As regards the protein ingredient, suitable sources of such include, for example, milk solids (e.g., in the form of cream, whole milk, skim milk, or non-fat milk solids), sodium caseinate, casein hydrolyzates, milk protein concentrates, hydrolyzed vegetable protein, and vegetable protein concentrates. Preferably the protein source is water soluble.

As suitable emulsifying agents may be mentioned, for example, the monoglycerides of fatty acids, such as monostearin; polyoxyalkylene ethers of fatty esters of polyhydric alcohols, such as the polyoxyethylene ethers of sorbitan monostearate (e.g., Polysorbate 60); or sorbitan tristearate (e.g., Polysorbate 65); fatty esters of polyhydric alcohols, such as sorbitan monostearate; esters of glycerol and fatty acids, such as propylene glycerol monostearate; partial esters of carboxylic acids and glycosides of fatty acids, such as glycerol lactopalmitate; and polyglycerol esters of fatty acids.

The thickener ingredient may be any food grade stabilizer of hydrophilic colloids. Examples include the hydrophilic polysaccharide stabilizers, especially the gums, cellulosic stabilizers, alginates (e.g., sodium alginate), and modified starches. Suitable gums include vegetable or synthetic gums, e.g., carrageenan, xanthan, guar gum, and carob seed gum. Suitable cellulosic thickeners include cellulose ethers (e.g., methyl cellulose), carboxymethylcellulose, and microcrystalline cellulose. (Purified carboxymethylcellulose often is referred to as "cellulose gum.")

EXAMPLE 1

To make what is referred to in the industry as a "full fat" topping, the following ingredients (totaling 7000 pounds) are mixed in a 1000 gallon, steam-jacketed, stainless steel tank fitted with a high-speed mixer. They are added to the tank in the order listed:

| Ingredient | Wt. % |
| --- | --- |
| Hydrogenated Coconut & Palm Kernel Oil | 20.00 |
| Sorbitan Monostearate | 0.12 |
| Polysorbate 60 | 0.28 |
| Sodium Caseinate | 1.00 |
| Xanthan Gum | 0.10 |
| Guar Gum | 0.05 |
| Water | 45.2 |
| High Fructose Corn Syrup | 10.00 |
| Corn Syrup | 23.00 |
| Flavoring Agents | 0.20 |
| Coloring Agents | 0.05 |
| Total | 100.00 |

To pasteurize the mixture, it is heated to a temperature of 150° F. in the aforementioned tank and held there for 20 minutes.

The pasteurized mixture is homogenized at 8000 psi, using a Gaulin homogenizer capable of homogenizing at a rate of about 100 to 150 lbs./min.

The resulting emulsion exits the homogenizer at a temperature of approximately 175–180° F. It is then cooled in an APV plate heat exchanger to approximately 40° F. On exiting the heat exchanger, the emulsion is pumped into a 1,000-gallon surge tank. Once the amount of emulsion in the tank reaches 1,000 pounds, transfer of the emulsion to a second 1,000-gallon tank begins. The filling of the first tank continues. Both tanks are equipped with cooling jackets.

Once the amount of chilled emulsion in the second tank reaches 6,000 pounds, a timer is started. Pumping continues until the second tank is full, which takes approximately 20 more minutes after the starting of the timer. Then the emulsion is allowed to rest, relatively undisturbed, in the second tank. The only agitation is that which is imparted by the slow revolution (about 20 rpm) of scraper blades around the interior wall of the tank, to remove any crystals of the product that stick to the wall, due to the cooling. One hour after the timer is started, the emulsion is at a temperature in the range of about 35 to 45° F., and enough of the fat has crystallized that the emulsion is ready to be aerated and whipped.

The emulsion is then pumped from the second tank through a tube-in-tube heat exchanger, to bring its temperature to approximately 40–42° F. Upon exiting the heat exchanger, the chilled emulsion is aerated and whipped using a Waukesha Cherry-Burrell CR mixer with internal recirculation, Model 402158Q08, which is an intermeshing pin mixer. The mixer is the 16 inch model, equipped with a cooling jacket. In the attached drawings, FIG. 1 is a schematic, cross-sectional representation of the mixer.

As indicated in FIG. 1, the CR mixer has a rotor 10 that carries two rotating discs 11 and 12. Disc 12, which faces the mixer outlet 13, is solid. Disc 11, which faces the variable drive motor 14, has openings 15 adjacent the rotor driving shaft 16. Both discs carry pins 17 that mesh closely with mating stationary pins 18 that protrude from the mixer heads 19 and 20. The emulsion is pumped into the mixer through the cylindrical housing inlet 21 and is pulled past the intermeshing pins 17 and 18 on the left side, and through the openings 15 in disc 11. Pressurized food aeration gas (e.g., air or nitrogen) is added to the emulsion through a gas inlet (not shown) at liquid inlet 21. The portion of rotor 10 that extends between discs 11 and 12 carries a plurality of vanes 22 that sling the liquid that passes through openings 15 to the periphery of the mixer. From there a portion of the liquid is directed back to the multi-pass mixing zone 23, on the left side, by a plurality of stationary product sweeper vanes 24, which protrude from the interior-facing wall of the cooling jacket 25 that surrounds the mixing zones. Another portion of the liquid is pulled past the intermeshing pins 17 and 18 on the right side and leaves the mixer through outlet 13.

The number of times the emulsion is recycled through the multi-pass zone 23 depends on the rotor speed and product consistency. The higher the rotor speed, the more times the material in process is made to recirculate through the multi-pass zone.

The CR mixer is a continuous flow mixer—i.e., one in which there is a constant throughput, with fresh liquid and aeration gas being continuously pulled in and aerated/mixed liquid being continuously ejected.

The CR mixer is operated at a rotor speed of approximately 500 rpm. Air is constantly added to the emulsion from a 0.5 inch interior diameter air line that is under a pressure of about 100 psig. The air line nozzle (also not shown) has eight circular openings, each of which is 3/32 inch in diameter. The mixer is operated under a back pressure of approximately 22–28 psig. Going into the CR mixer, the emulsion has a viscosity of approximately 175 to 225 cp. Coming out of the mixer, the aerated emulsion has a viscosity that is approximately 50 to 150 cp higher (as measured after removing the emulsion from the system at this point and allowing it to be gradually depressurized to atmospheric pressure).

The aerated emulsion is conveyed through two-inch (I.D.) stainless steel tubing (approximately 5 to 10 feet in length) to a Collette Converticoll mixer from GEI Turbo, Model CVC 3000. The Converticoll mixer is a non-recirculating, cooperating pin mixer constructed substantially as disclosed in U.S. Pat. No. 5,470,153, which is hereby incorporated herein by reference. The Converticoll mixer has a greater pin density than the CR mixer used in the first step. The Converticoll also is equipped with a cooling jacket.

There is little or no pressure drop in the line between the CR mixer and the Converticoll mixer. Although the Converticoll mixer is designed for connection to a source of aeration gas, it is here used solely as a turbulent mixer—i.e., the gas inlet nozzle is kept closed. The Converticoll is run at a rotor speed of approximately 500 rpm, under a back pressure of about 25–27 psig. Although it is run at about the same rotor speed as the CR mixer, because the Converticoll has a greater number of pins (creating a higher pin density), the emulsion is subjected to a higher average shear rate in the Converticoll than in the CR mixer.

The whipped topping exits the Converticoll aerator at a temperature of approximately 55° F. and a viscosity that is approximately 50 to 150 cp higher than when it entered the Converticoll.

From the Converticoll aerator, the topping is conveyed through two-inch (I.D.) stainless steel tubing to a Contherm scraped-surface heat exchanger, Model 6X9, from Alfa Laval. The tubing is approximately 5 to 10 feet long. The Contherm, which also is equipped with a cooling water jacket, is also operated at approximately 500 rpm, but under a back pressure of approximately 22–25 psig. The whipped product exits the scraped-surface heat exchanger still at a temperature of approximately 55° F.

To gradually lower the pressure on the whipped topping, it is passed from the Contherm heat exchanger through a 20-foot length of two-inch (I.D.) stainless steel tubing. At the end of the tubing there is a diverter valve, through which the topping can be directed either to a filler hopper or, if the topping is out of spec, to a disposal system. In the filler hopper the whipped topping is under atmospheric pressure. There it can be measured for overrun. This is done repeatedly, at intervals of approximately 5 minutes. Over a span of approximately 20 minutes, the product is found to have a relatively consistent overrun, ranging from a low of approximately 250% to a high of approximately 290%. This represents a swing in product volume between 350 and 390, a difference of less than 12%, which is quite acceptable.

Although specific embodiments of the present invention have been described above in detail, it will be understood that this description is merely for purposes of illustration. Various modifications of and equivalent structures corresponding to the disclosed aspects of the preferred embodiments described above may be made by those skilled in the art without departing from the spirit of the present invention, which is defined in the following claims.

What is claimed:

1. In a process of making a containerized frozen whipped topping by a process that includes the following sequential steps:
   (a) forming a mixture comprising water, water-soluble carbohydrate, fat, protein, emulsifying agent, and thickener;
   (b) pasteurizing the mixture;
   (c) homogenizing the mixture to form an oil-in-water emulsion;
   (d) cooling the emulsion to a temperature in the range of about 27 to 45° F.;
   (e) holding the emulsion at a temperature in the range of about 27 to 45° F. for a long enough time to allow at least some of the fat to crystallize;
   (f) aerating and whipping the emulsion into a topping;
   (g) dispensing the topping into containers; and
   (h) freezing the topping while in the containers,
   the improvement wherein step f comprises the substeps of
   (i) adding aeration gas to the cooled emulsion,
   (ii) subjecting the gas-containing emulsion to turbulent mixing in a first mixing zone, for a time sufficient to disperse the gas in the emulsion and raise the viscosity of the emulsion, and
   (iii) subjecting the resultant emulsion to further turbulent mixing in a second mixing zone, using a higher average shear rate than used in the first zone, for a time sufficient to achieve an overrun value of at least about 175 percent.

2. The process of claim 1, wherein steps f and g are performed with a substantially continuous flow path of product from substep i through step g, under a back pressure that is below 40 psig.

3. The process of claim 2, wherein substep ii is performed in an intermeshing vane mixer.

4. The process of claim 3, wherein substep iii also is performed in an intermeshing vane mixer.

5. The process of claim 4, wherein the back pressure is within the range of about 15 to 35 psig.

6. The process of claim 5, wherein the average shear rate used in the second mixing zone, in substep iii, is at least approximately 50 percent higher than that used in the first mixing zone, in substep ii.

7. The process of claim 5, wherein substantially no additional aeration gas is added to the emulsion in the second mixing zone.

8. The process of claim 5, wherein the average shear rate used in the first mixing zone, in substep ii, is approximately 20 sec$^{-1}$ or less.

9. The process of claim 8, wherein the average shear rate used in the second mixing zone, in substep iii, is approximately 30 sec$^{-1}$ or more.

10. The process of claim 9, wherein the average shear rate used in the first mixing zone, in substep ii, is in the range of about 10 to 20 sec$^{-1}$.

11. The process of claim 5, wherein, in substep iii, the mixing is conducted for a time sufficient to achieve an overrun value of about 200 to 350 percent.

12. The process of claim 5, wherein the mixer used in substep ii is a recirculating mixer.

13. The process of claim 12, wherein the mixer used in substep iii is a non-recirculating mixer.

14. The process of claim 5, wherein, in step f, the emulsion is not allowed to warm to a temperature higher than about 60° F.

15. The process of claim 14, wherein, during substeps i and ii, the emulsion is not allowed to warm to a temperature higher than about 50° F.

16. The process of claim 5, wherein step f also comprises the substep of subjecting the emulsion from substep iii to further mixing in a scraped-surface heat exchanger.

* * * * *